May 19, 1925.
B. JOHNSON
INCUBATOR
Filed May 17, 1924  4 Sheets-Sheet 1
1,538,285
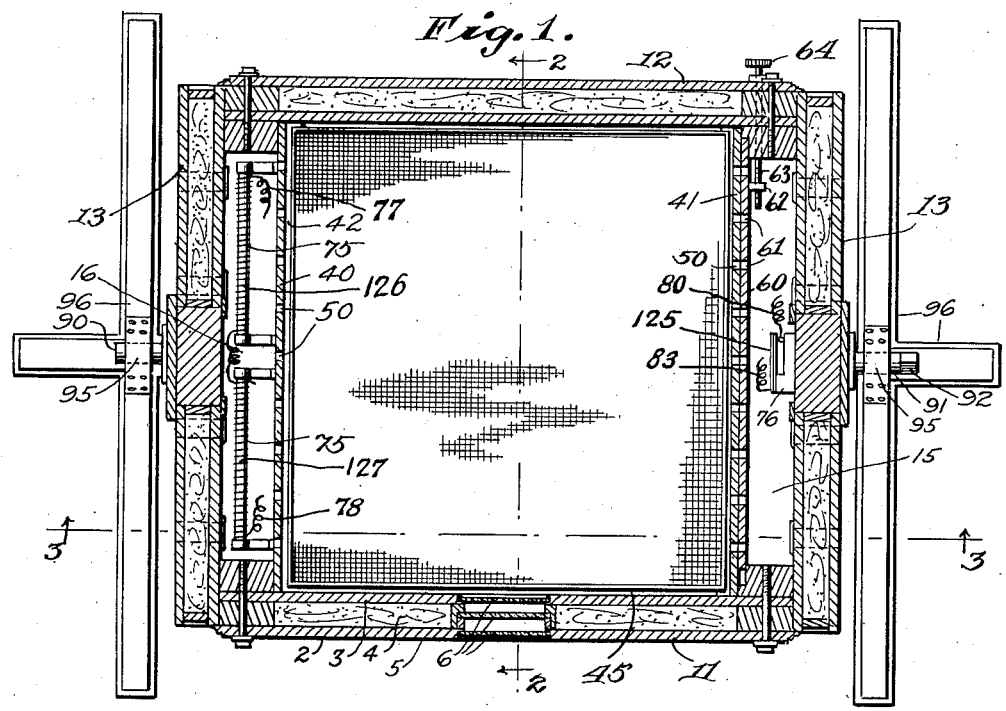
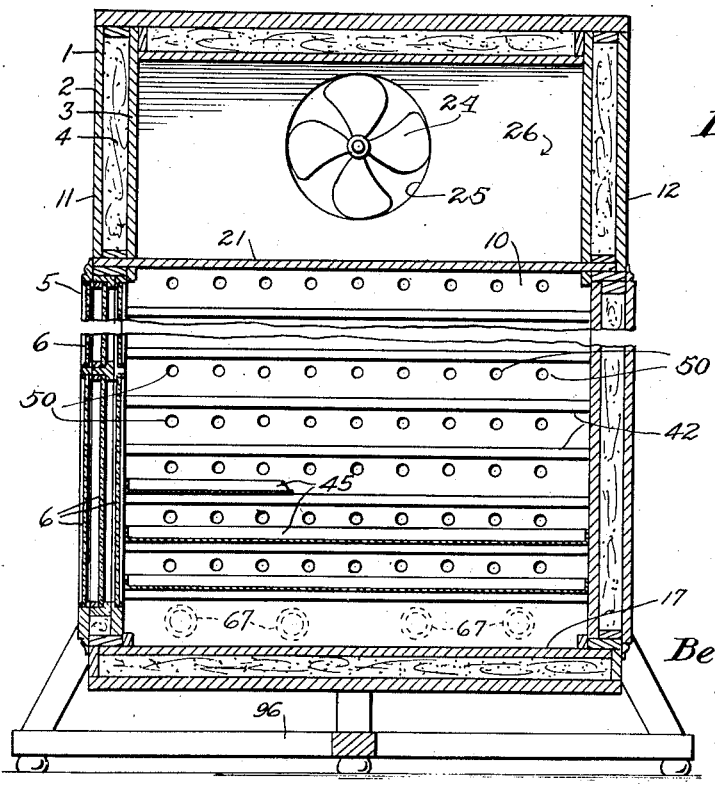
Inventor
Ben Johnson
by
F. A. Witherspoon
Attorney May 19, 1925.

B. JOHNSON

INCUBATOR

Filed May 17, 1924 4 Sheets-Sheet 2

1,538,285

Inventor
Ben Johnson
by F.A. Witherspoon
Attorney

May 19, 1925.  1,538,285
B. JOHNSON
INCUBATOR
Filed May 17, 1924   4 Sheets-Sheet 3

Inventor
Ben Johnson
by
F. A. Witherspoon
Attorney

May 19, 1925.                                                    1,538,285
                              B. JOHNSON
                              INCUBATOR
                         Filed May 17, 1924         4 Sheets-Sheet 4

Inventor
Ben Johnson
by
F. A. Witherspoon
Attorney

Patented May 19, 1925.

1,538,285

UNITED STATES PATENT OFFICE.

BEN JOHNSON, OF NEW ORLEANS, LOUISIANA, ASSIGNOR OF TWO-THIRDS TO VICTOR C. SMITH AND ONE-THIRD TO WILLIAM W. WALL, BOTH OF NEW ORLEANS, LOUISIANA.

INCUBATOR.

Application filed May 17, 1924. Serial No. 714,003.

*To all whom it may concern:*

Be it known that I, BEN JOHNSON, a citizen of the United States, residing at New Orleans, in the parish of Orleans and State of Louisiana, have invented certain new and useful Improvements in Incubators; and I do hereby declare the following to be a full, clear, and exact description of the invention, such as will enable others skilled in the art to which it appertains to make and use the same.

This invention relates to an apparatus for the incubation of eggs, and has for its object to provide an apparatus of this character which will be comparatively inexpensive to manufacture, and more certain and efficient in action than those which have been heretofore proposed.

With these and other objects in view, the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a horizontal sectional view of the device taken on the line 1—1 of Figure 4, and looking in the direction of the arrows;

Figure 2 is a fragmentary vertical sectional view of the device taken on the line 2—2 of Fig. 1, and looking in the direction of the arrows;

Figure 3:
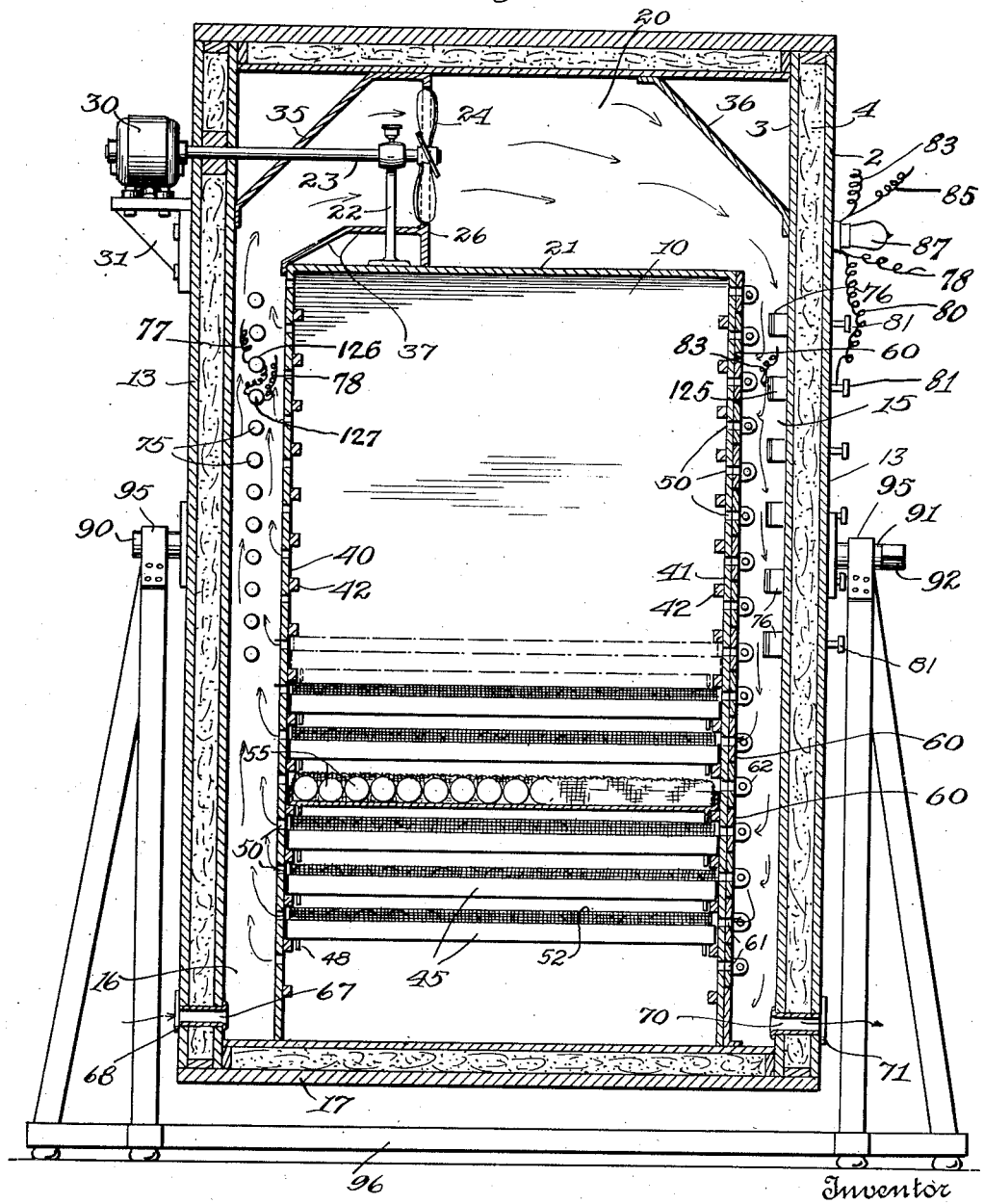
Figure 3 is a vertical sectional view taken on the line 3—3 of Fig. 1, and looking in the direction of the arrows.
Figure 4:
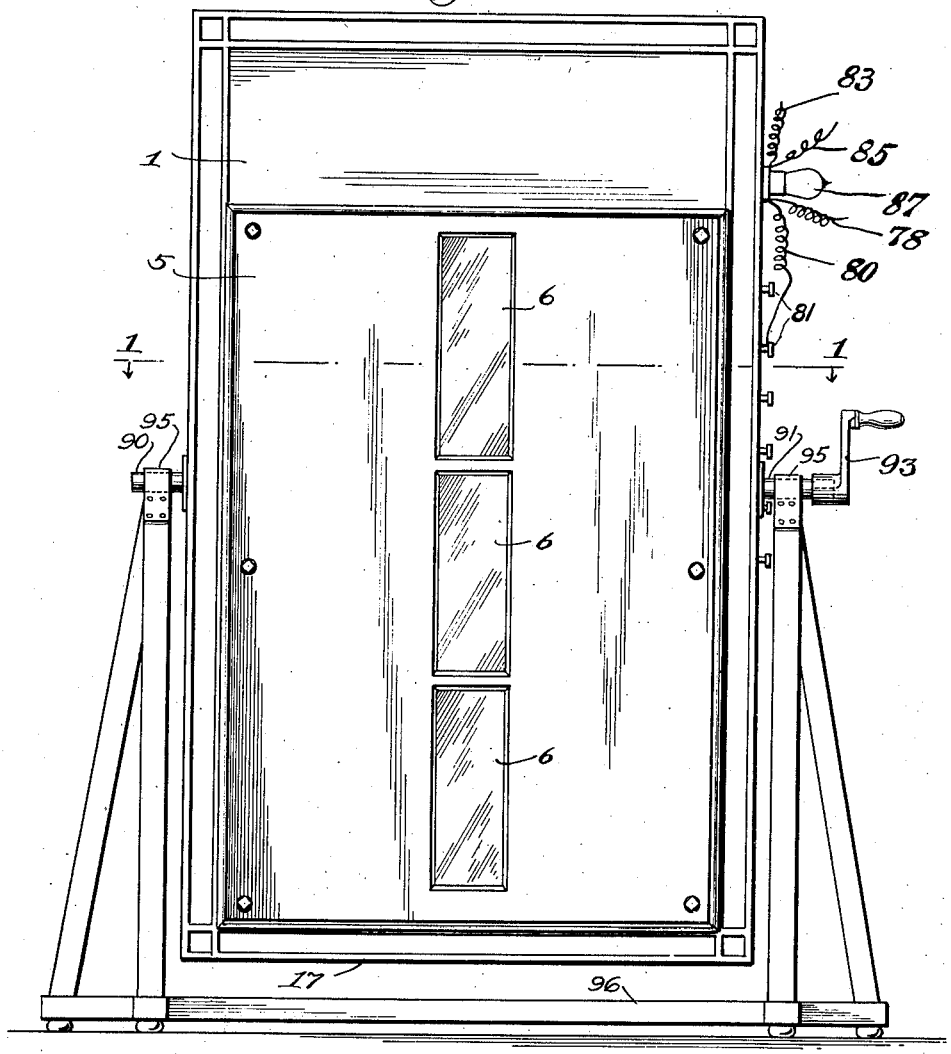
Figure 4 is a front elevational view of the device.

Referring to the drawings, 1 indicates the outer chamber, which is made of any heat insulated construction desired and illustrated as being composed of the outer shell 2 and the inner shell 3, having interposed therebetween insulating material 4 such as cork, mineral, or bagasse fiber. On the front side, chamber 1 is provided with any suitable closure 5 composed of the same heat insulating material or otherwise constructed as desired, provided with the sight windows 6 so disposed as to permit the contents of the device to be readily seen. Within the chamber 1, and rigid therewith, is the frame member 10 extending between the front 11 and the back 12 of the chamber 1 and contacting therewith but spaced from the sides 13 of the said chamber to produce the vertically disposed air passageways 15 and 16, open at their tops but closed at their bottoms by the floor 17 of the chamber. The frame 10 does not extend to the top of the chamber, but is of sufficient height to form a cross passageway 20 connecting with the open upper ends of the vertical air passageways 15 and 16.

From the construction so far disclosed, it will be seen that there is provided a chamber within which is disposed a frame around three sides of which there is provided a continuous air passageway. Mounted between the solid top portion 21 of the frame 10 and the top of the chamber 1 is any suitable bearing 22 supporting one end of a shaft 23 carrying at one extremity an exhaust fan 24 disposed in a circular opening 25 of a bulkhead 26 disposed across and obstructing the upper passageway 20. The shaft 23 extends through one of the sides 13 of the chamber 1, as shown in Fig. 3, and connects with the motor 30 mounted on the bracket 31 on the outside of the said chamber 1. Disposed obliquely across the inner upper corners of the chamber 1 are the deflecting plates 35 and 36 to direct the flow of air through the passages and also to prevent any air eddies or pockets that might form. Mounted on the top 21 of the frame 10, and on the suction side of the exhaust fan 24, as shown in Fig. 3, is another deflecting plate 37 for the same purpose.

Figure 7:
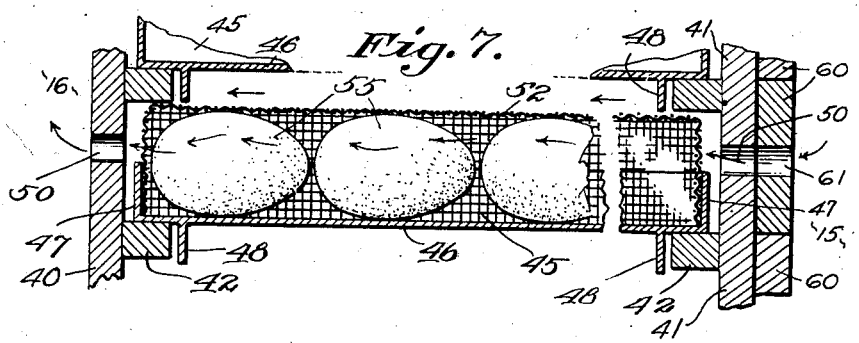
Figure 7 is a fragmentary detail view in section of one of the egg tray compartments.

The frame 10 is provided with the vertically disposed side plates 40 and 41 upon which are located the stops 42 which serve as supports and guides for the egg trays 45, of which there are a plurality arranged in superimposed levels, as clearly indicated in the drawings. These egg trays 45 are provided with a solid bottom 46 having the upturned sides 47 and oppositely disposed depending flanges 48, said flanges being for the purpose of positioning and stabilizing the trays 45 in the frame 10. The trays 45 are of a depth from front to back as seen in Fig. 1, to closely fit the space between the front 11 and the back 12 of the chamber 1, and as clearly indicated in Figs. 3 and 7, it will be seen that the upstanding sides 47 of the trays 45 extend to, but not above, a plurality of apertures 50, provided in the side plates 40 and 41 of the frame 10. A removable wire mesh cover 52 is provided for each tray 45 and from Fig. 7, it will be observed that this wire cover is adapted to hold the eggs 55 within the trays, preventing their turning over when the chamber 1 is oscillated.

On the passageway side or exterior of the frame 10, and in slidable contact with the side 41 thereof are a plurality of slides 60, which are provided with apertures 61 adapted to register with the apertures 50 of said side 41. At one end of each slide 60 there is provided a lug 62 extending at right angles to said slide and screw-threaded to receive the threaded adjusting screw 63 extending through the wall of the chamber 1 and provided on the outside thereof with the thumb knob 64 by means of which the said screws may be turned to change the position of each slide 60 with respect to the side 41 of the frame 10, all as will be readily understood. From the foregoing, and with particular reference to Figs. 1, 3 and 6, it will be seen that each slide 60 may be moved separately and individually so that the apertures 61 in the said slides may be so positioned with reference to the apertures 50 as to close the same in one limit of movement, or to leave the apertures 50 in full open registry with the apertures 61 of the slide in the other extreme limit of movement.

The chamber 1 is provided near the bottom thereof, see Fig. 3, with a plurality of vents 67 opening into the passageway 16 and provided with any suitable valve such as the flap 68 on the outside of the chamber 1. On the other side the chamber 1 is provided with a plurality of similar vents 70 likewise provided with the flap valve 71, as shown, and opening into the air passageway 15. The vents 67 are provided for the admission of fresh air, while the vents 70 provide a means of discharge for the foul air. The circulation of air through the incubator may be varied as to humidity as desired in any suitable way, not shown. One such way might consist in moistening the air introduced to the circuit through the inlet vent 67.

Within the passageway 16 is mounted any suitable heating means such as the electric coils 75, disposed to the best advantage, that the air used in the circulation of the incubator may be heated on its way to the exhaust fan 24. In the other vertical passageway 15, and preferably above the middle thereof, are disposed a plurality of control means, such for example the thermostats 76, for controlling the temperature of the air being circulated through the incubator. That is to say, each of the thermostats 76 controls one or more of the heating coils 75. Referring to Figs. 1 and 3, the thermostat such as indicated by the numeral 125 will control the heating coils 126 and 127 which may be disposed in staggered relation in the passage 16, or in any other suitable position. Likewise the lowermost thermostat illustrated in Fig. 3 will control the two lowermost of the coils 75.

Figure 5:
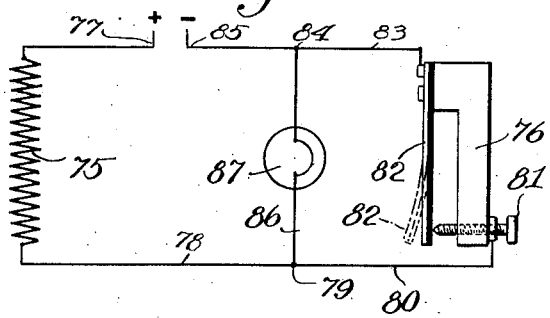
Figure 5 is a diagram of the wiring circuit of one of the heat control units.

By referring to Fig. 5, it will be seen that the heating coils 75 are controlled by the thermostats 76 in the following manner: Current from any suitable source will enter the circuit over the wire 77, pass along the same to and through the heating or resistance coil 75, thence along the wire 78 to the point 79 where it divides. A portion of the current will continue along the wire 80 to the adjusting screw 81 of the thermostat device 76, from which it can pass to the flexible element 82 of said thermostat, when the same is in contact with the screw 81, to and over the wire 83, to the point 84 and thence over the return wire 85 to the source. Should the degree of temperature in the air circuit become too high, the flexible member 82 of the thermostat 76 will become flexed to such a position as is indicated by the dotted lines in Fig. 5. In such a case, the circuit will be broken at the point of contact between the adjusting screw 81 and the flexible element 82, and no current will pass at this point. The current thereupon, will flow from the source as heretofore described to the point 79, thence over the wire 86, to and through the lamp 87, to the point 84, and back to the source, whereupon the amount of current in said circuit is reduced by throwing into circuit the added resistance of the lamp 87. As soon as the temperature in the air circuit is reduced to a predetermined degree, the flexible element 82 will flex reversely and make contact with the adjusting screw 81, thereby shunting the lamp circuit and allowing the current to flow as above described.

The position of the lamps 87 is immaterial to the invention, but in the preferred form they are advantageously located externally of the chamber so as to indicate the relative amount of current passing through the coils 75. That is to say, any unlighted lamp will indicate no current flowing through the coils 75 associated with said lamp. On the other hand, a dimly lighted lamp will indicate maximum current, and a bright illumination of a lamp will indicate a moderate amount of current passing through the associated coils. In the drawings, only one lamp has been shown for the purpose of illustration, but it will be understood that the other lamps are associated with the coacting elements in a similar manner.

The chamber 1 is provided on opposite sides with the trunnions 90 and 91, the latter being provided with any means by which the chamber 1 may be revolved or oscillated about the axis of the trunnions as a center. For the purpose of illustration, there may be provided a squared portion 92 at the extremity of the trunnion 91, adapting the same to be turned by a crank 93 fitting said squared end 92.

Figure 6:
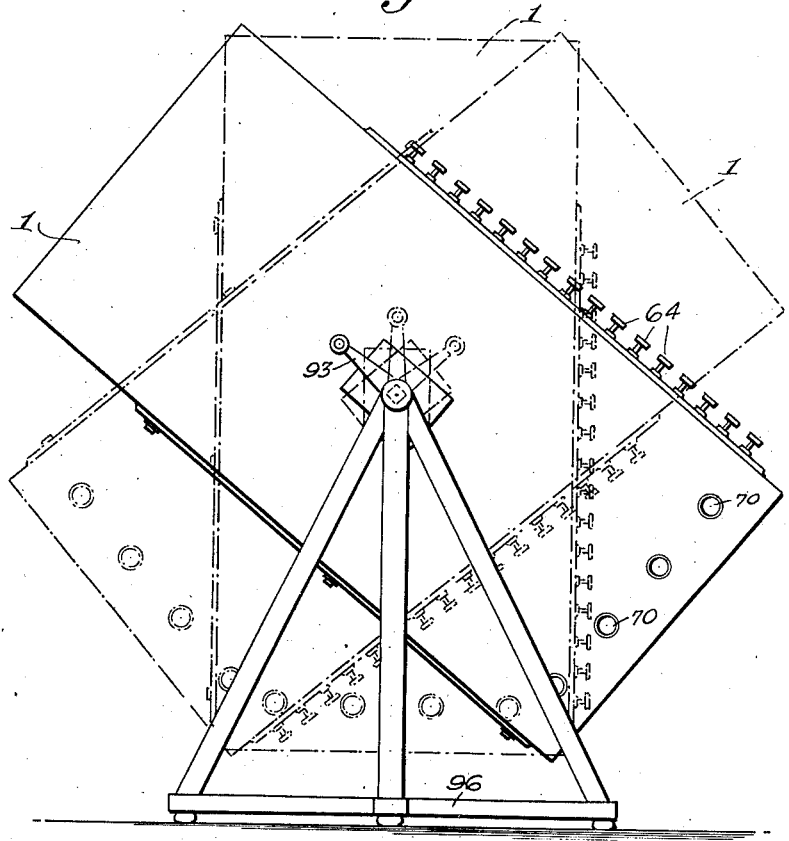
Figure 6 is a diagrammatic view illustrating different positions of the device.

By referring to Fig. 6, it will be seen that the chamber 1 may be oscillated, whereby the same will be made to assume any position desired and such as shown, for example by the full and dotted lines in said figure. In order that this chamber 1 may freely turn, the trunnions 90 and 91 are mounted in the bearings 95 of any suitable support, such as 96.

Thus, it will be seen from the foregoing that there is provided a chamber 1, so mounted on a support 96, as to be capable of being oscillated by any means such as a crank 93. Further, it will be seen that this chamber 1 is provided with a frame 10 containing trays 45 of eggs, and so positioned within such chamber as to provide an air passage about three sides of the same. The chamber 1 is also provided with a means, such as the exhaust fan 24, for circulating air through said passage. The frame 10, it will be seen, is provided with a plurality of apertures 50 in the sides thereof, through which the air circulated by the fan 24 must pass in order to go from the vertical passageway 15 to the opposite vertical passageway 16. The air in so circulating may be controlled at any tray level by means of a control slide 60, whereby the amount of air passing over the eggs at any level may be controlled. It is to be observed that air entering through any one of the horizontal rows of apertures 50 cannot pass upwardly or downwardly within the frame 10 by virtue of the fact that the solid bottoms 46 of two adjacent egg trays 45 constitute a compartment and so prevent air from passing in any direction other than horizontal through said compartment, and out the oppositely disposed apertures 50 into the suction passageway 16, all as will be clear from Figs. 3 and 7, in which the current of air is indicated by the arrows.

This improved apparatus of hatching eggs is particularly designed for extensive operations wherein a chamber of large dimensions is adapted to contain thousands of eggs disposed in a plurality of horizontal compartments each separated from the other and said compartments arranged in tiers or levels. This apparatus employs a forced circulation of heated air obtained by exhausting the air from the egg compartments, heating the same to a temperature suitable to the hatching of the eggs, which has been found to range between 100° to 105° F. The control of the temperature in this circuit may be made to conform with the different stages of incubation used by nature. At a predetermined time before the completion of the incubation, the screen covers 52 will be removed from the trays 45, and the chamber 1 left in a vertical position.

It is obvious that those skilled in the art may vary the details of construction as well as the arrangement of parts without departing from the spirit of the invention, and therefore it is not wished to be limited to the above disclosure except as may be required by the claims.

What is claimed is:

1. In an incubator adapted to receive and hatch eggs, the combination of a closed chamber adapted to be oscillated; a frame within said chamber provided with trays closely fitting said frame and forming separate tray compartments therein; said frame being further provided with oppositely disposed perforated sides whereby air may pass through said tray compartments; a passage around three sides of said frame connecting said oppositely disposed perforations; means to circulate air through said passage and through said tray compartments; means to control the circulation of said air; means to heat said air; automatic means to regulate the temperature of said air; and means to oscillate said chamber whereby the position of the eggs may be changed.

2. In an incubator adapted to receive and hatch eggs, the combination of a closed chamber adapted to be oscillated; a frame provided with a plurality of trays forming egg compartments arranged at different levels, said frame disposed within said chamber to provide a pair of oppositely disposed vertical air passages connected at their tops by a cross air passage; openings in said frame whereby air may pass from one to the other of said vertical passages through said compartments; means to circulate air through said air passages and compartments; means to control the circulation of air; and means to oscillate said chamber whereby the position of the eggs may be changed.

3. In an incubator adapted to receive and hatch eggs, the combination of a closed chamber adapted to be oscillated; a frame within said chamber and rigid therewith, said frame provided with trays closely fitting said frame and forming separate tray compartments therein, said frame being further provided with oppositely disposed perforated sides whereby air may pass through said tray compartments; a passage around three sides of said frame connecting said oppositely disposed perforations; means to circulate air through said passage and through said tray compartments; means to control the circulation of said air; means to heat said air; automatic means to regulate the temperature of said air; and means to oscillate said chamber whereby the position of the eggs may be changed.

4. In an incubator adapted to receive and hatch eggs, the combination of a closed chamber adapted to be oscillated; a frame within said chamber and rigid therewith, said frame provided with trays closely fitting said frame and forming separated tray compartments therein, said frame being further provided with oppositely disposed perforated sides whereby air may pass through said tray compartments; a passage around three sides of said frame connecting said oppositely disposed perforations; means comprising a fan to circulate air through said passage and through said tray compartments; means to control the circulation of said air; means to heat said air; automatic means to regulate the temperature of said air; and means to oscillate said chamber whereby the position of the eggs may be changed.

5. In an incubator adapted to receive and hatch eggs, the combination of a closed chamber adapted to be oscillated; a frame within said chamber and rigid therewith, said frame provided with trays closely fitting said frame and forming separate tray compartments therein, said frame further provided with oppositely disposed perforated sides whereby air may pass through said tray compartments; a passage around three sides of said frame connecting said oppositely disposed perforations; means to circulate air through said passage and through said tray compartments; means comprising adjustable slides to control the circulation of said air through each tray compartment; means to heat said air; automatic means to regulate the temperature of said air; and means to oscillate said chamber whereby the position of the eggs may be changed.

6. In an incubator adapted to receive and hatch eggs, the combination of a closed chamber adapted to be oscillated; a frame rigidly mounted in said chamber provided with a plurality of trays forming egg compartments arranged at different levels, said frame disposed within said chamber to provide a pair of oppositely disposed vertical air passages connected at their tops by a cross air passage; openings in said frame whereby air may pass from one to the other of said vertical passages through said compartments; means to circulate air through said air passages and compartments; means to control the circulation of air; and means to oscillate said chamber whereby the position of the eggs may be changed.

7. In an incubator adapted to receive and hatch eggs, the combination of a closed chamber adapted to be oscillated; a frame rigidly mounted in said chamber provided with a plurality of trays forming egg compartments arranged at different levels, said frame disposed within said chamber to provide a pair of oppositely disposed vertical air passages closed at their bottoms and connected at their tops by a cross air passage; openings in said frame whereby air may pass from one to the other of said vertical passages through said compartments; means to circulate air through said air passages and compartments; means to control the circulation of air; and means to oscillate said chamber whereby the position of the eggs may be changed.

8. In an incubator adapted to receive and hatch eggs, the combination of a closed chamber adapted to be oscillated; a frame rigidly mounted in said chamber provided with a plurality of trays forming egg compartments arranged at different levels, said frame disposed within said chamber to provide a pair of oppositely disposed vertical air passages connected at their tops by a cross air passage; openings in said frame whereby air may pass from one to the other of said vertical passages through said compartments; means comprising a fan to circulate air through said air passages and compartments; means to control the circulation of air; and means to oscillate said chamber whereby the position of the eggs may be changed.

9. In an incubator adapted to receive and hatch eggs, the combination of a closed chamber adapted to be oscillated; a frame rigidly mounted in said chamber provided with a plurality of trays forming egg compartments arranged at different levels, said frame disposed within said chamber to provide a pair of oppositely disposed vertical air passages connected at their tops by a cross air passage; openings in said frame whereby air may pass from one to the other of said vertical passages through said compartments; means to circulate air through said air passages and compartments; means comprising adjustable slides to control the circulation of air; and means to oscillate said chamber whereby the position of the eggs may be changed.

In testimony whereof I affix my signature.

BEN JOHNSON.